(12) United States Patent
Suefuji (10) Patent No.: US 11,545,916 B2
(45) Date of Patent: Jan. 3, 2023

(54) VIBRATION-TYPE ACTUATOR INCLUDING MEMBER THAT RESTRAINS MOVEMENT OF VIBRATING BODY WITH RESPECT TO SUPPORTING MEMBER, AND APPARATUS THAT USES THE SAME

(71) Applicant: CANON KABUSHIKI KAISHA, Tokyo (JP)

(72) Inventor: Kei Suefuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/373,156

(22) Filed: Jul. 12, 2021

(65) Prior Publication Data
US 2022/0014119 A1 Jan. 13, 2022

(30) Foreign Application Priority Data
Jul. 13, 2020 (JP) ............................. JP2020-119930

(51) Int. Cl.
*H02N 2/00* (2006.01)
*G03B 17/56* (2021.01)

(52) U.S. Cl.
CPC ........... *H02N 2/001* (2013.01); *H02N 2/0055* (2013.01); *G03B 17/561* (2013.01)

(58) Field of Classification Search
CPC ...... H02N 2/001; H02N 2/0055; H02N 2/103; G03B 17/561
See application file for complete search history.

(56) References Cited

U.S. PATENT DOCUMENTS

| | | |
|---|---|---|
| 8,970,091 B2 | 3/2015 | Suefuji |
| 10,536,616 B2 | 1/2020 | Fukuzawa |
| 10,917,024 B2 | 2/2021 | Suefuji |
| 2015/0171773 A1* | 6/2015 | Suefuji ................. H02N 2/163 310/323.16 |
| 2020/0177107 A1 | 6/2020 | Suefuji |

FOREIGN PATENT DOCUMENTS

JP 2019-045848 A 3/2019

\* cited by examiner

*Primary Examiner* — Emily P Pham
(74) *Attorney, Agent, or Firm* — Venable LLP (57) ABSTRACT

A vibration-type actuator, which achieves high accuracy and durability, includes a vibrating body, a contact body, a supporting member, and at least one positioning and holding member. The vibrating body includes an elastic body with grooves and projecting portions alternately formed in a direction of relative movement of the vibrating body and the contact body, and further includes an electromechanical transducer mounted on the elastic body. The at least one positioning and holding member restrains movement of the vibrating body with respect to the supporting member in the relative movement direction, and includes an interposing portion interposed between a plurality of the projecting portions and a mounting portion mounted on the supporting member. The supporting member includes a receiving portion onto which the mounting portion is mounted with a clearance formed between the mounting portion and the receiving portion in the relative movement direction.

10 Claims, 9 Drawing Sheets

VIBRATION-TYPE ACTUATOR INCLUDING MEMBER THAT RESTRAINS MOVEMENT OF VIBRATING BODY WITH RESPECT TO SUPPORTING MEMBER, AND APPARATUS THAT USES THE SAME

BACKGROUND OF THE INVENTION

Field of the Invention

The present invention relates to vibration-type actuators and apparatuses, and in particular to how a vibrating body is supported in a vibration-type actuator.

Description of the Related Art

Vibration-type actuators are known which are capable of moving one of a vibrating body and a contact body relative to the other by bringing the contact body and the vibrating body into contact with each other and exciting progressive vibration waves in the vibrating body to cause the vibrating body to apply frictional driving force to the contact body. Such vibration-type actuators have a simple structure, are easy to be thinned, and are capable of being driven quietly with high accuracy. For this reason, vibration-type actuators are used as driving motors in a variety of equipment and apparatuses such as rotation drive apparatuses for lens barrels, camera platforms, and so forth, manufacturing apparatuses for industrial automation, and office appliances.

For example, Japanese Laid-Open Patent Publication (Kokai) No. 2019-45848 describes a rotation drive apparatus that uses a vibration-type actuator for a drive mechanism that changes the pan/tilt angle of a camera. Specifically, a contact body of the vibration-type actuator for panning is fixed to a base member such that it is immovable. A vibrating body of the vibration-type actuator for panning is fixed to a pan unit by a positioning and holding member made of resin in a state in which interposing portions of the positioning and holding member are inserted into respective grooves between comb teeth such that the vibrating body is not rotatable with respect to the pan unit, and the pan unit is held on a base unit such that it is rotatable. Thus, when the vibration-type actuator for panning is driven, the pan unit rotates in a panning direction with respect to the base unit.

The pan unit holds a tilt unit, and when the pan unit rotates in the panning direction, the tilt unit and the pan unit rotate integrally together in the panning direction. A contact body of the vibration-type actuator for tilting is fixed to the tilt unit holding a camera. A vibrating body of the vibration-type actuator for tilting is held by a supporting member fixed to the pan unit in a state in which rotation of the vibrating body in a tilting direction is restrained by interposing portions of a positioning and holding member inserted into respective spaces between comb teeth of the vibrating body for tilting. Thus, when the vibration-type actuator for tilting is driven, the tilt unit rotates in the tilting direction with respect to the pan unit.

Thus, in the rotation drive apparatus described in Japanese Laid-Open Patent Publication (Kokai) No. 2019-45848, highly responsive operations are implemented by using the vibration-type actuators for panning and tilting. Moreover, a use of the vibration-type actuators eliminates the need for using a deceleration mechanism, and hence the rotation drive apparatus is downsized. Furthermore, by inserting the interposing portions of the positioning and holding member into the respective spaces between the comb teeth of the vibrating body, the rotation of the vibrating body is restrained while vibrations excited in the vibrating bodies are prevented from becoming small.

However, there is still room for improvement in the technique described in Japanese Laid-Open Patent Publication (Kokai) No. 2019-45848 for reasons described below. The positioning and holding member includes an annular portion on which a plurality of interposing portions is provided integrally with the annular portion at substantially regular intervals such that the interposing portions project outwardly in a radial direction from an outer periphery of the annular portion. In order to reliably put a plurality of interposing portions into the respective spaces between the comb teeth of the vibrating body, the width of each interposing portions needs to be smaller than that of the corresponding space between the comb teeth of the vibrating body, and hence it is not easy to increase stiffness of the interposition portion.

For this reason, there is a demand for vibration-type actuators that achieve high driving accuracy and durability even when, for example, a rotation drive apparatus employing such a vibration-type actuator has repeated rapid acceleration and deceleration for long hours, or the vibration-type actuator has been driven under excessive load.

SUMMARY OF THE INVENTION

The present invention provides vibration-type actuators that achieve high driving accuracy and durability, and apparatuses using the same.

According to an embodiment of the present invention, a vibration-type actuator includes a vibrating body; a contact body in contact with the vibrating body; a supporting member that supports the vibrating body; and at least one positioning and holding member that restrains movement of the vibrating body with respect to the supporting member in a relative movement direction in which one of the vibrating body and the contact body moves relatively to the other. The vibrating body includes an elastic body including grooves and projecting portions that are alternately formed in the relative movement direction; and an electromechanical transducer that is mounted on the elastic body. The at least one positioning and holding member includes: an interposing portion that is interposed between a plurality of the projecting portions; and a mounting portion that is mounted on the supporting member. The supporting member includes a receiving portion onto which the mounting portion is mounted with a clearance, and the clearance is formed between the mounting portion and the receiving portion in the relative movement direction.

According to the present invention, provided vibration-type actuators achieve high driving accuracy and durability.

Further features of the present invention will become apparent from the following description of exemplary embodiments (with reference to the attached drawings).

DESCRIPTION OF THE EMBODIMENTS

Embodiments of the present invention will now be described in detail with reference to the accompanying drawings.

Figure 1:
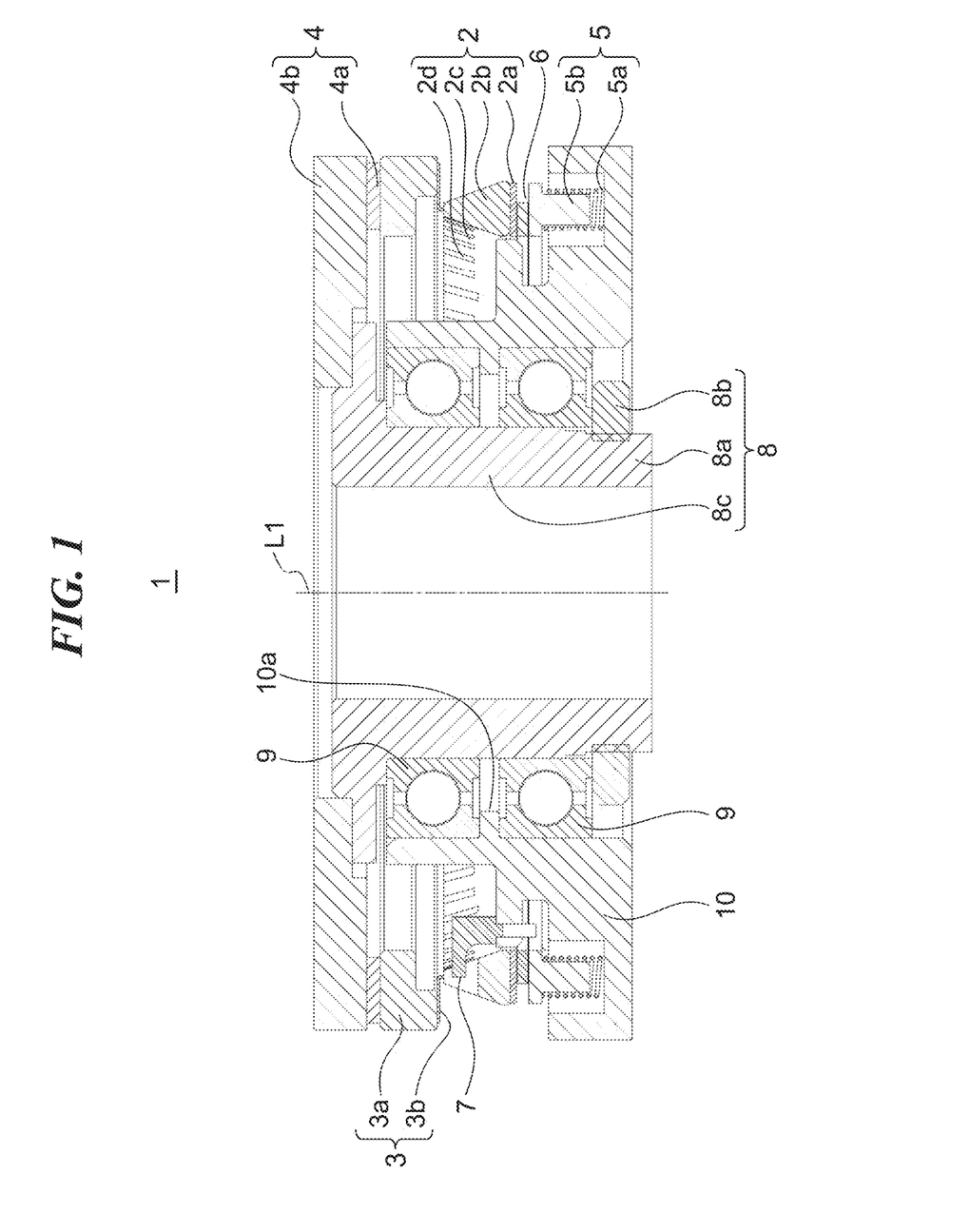
FIG. 1 is a cross-sectional view schematically illustrating an arrangement of a vibration-type actuator according to a first embodiment of the present invention.

FIG. 1 is a cross-sectional view schematically illustrating an arrangement of a vibration-type actuator 1 according to a first embodiment of the present invention. The vibration-type actuator 1 includes a vibrating body 2 and a contact body 3.

The vibrating body 2 includes a piezoelectric element 2a that is an example of an electromechanical transducer converting electrical energy into mechanical energy, and an elastic body 2b that is joined to the piezoelectric element 2a. The elastic body 2b has an annular shape and is made of a metallic material such as stainless steel. On an upper surface (a surface on the contact body 3 side) of the elastic body 2b, a plurality of grooves 2d is formed, and thereby a plurality of projecting portions 2c is disposed at substantially regular intervals in the circumferential direction of the elastic body 2a (in other words, the grooves 2d and the projecting portions 2c are formed or disposed alternately in the circumferential direction). Top surfaces of the projecting portions 2c act as frictional sliding surfaces that apply frictional driving force to the contact body 3 while being in contact with the contact body 3. The top surfaces of the projecting portions 2c are treated to increase durability (wear resistance) by nitriding (surface hardening treatment), plating to incorporate hard particles or other treatments. Positioning and holding members 7 are mounted on a supporting member 10 so as to restrain movement of the vibrating body 2 in the circumferential direction (a direction of rotation around a central axis i.e., a rotational axis L1), which is a relative movement direction of the vibrating body 2 and the contact body 3. Details of the positioning and holding members 7 (also referred to as "the positioning members") will be described later. It should be noted that the rotational axis L1 is a center line of the annular elastic body 2b. The relative movement direction is a direction in which one of the vibrating body 2 and the contact body 3 rotates relatively to the other around the rotational axis L1 (a center line).

The contact body 3 has an annular shape in contact with the projecting portions 2c of the elastic body 2b, and the vibrating body 2 and the contact body 3 stay in contact with each other with a constant pressure arising from an urging force from urging members 5. The contact body 3 includes a main body portion 3a and a contact portion 3b. The contact portion 3b includes a sliding surface in contact with the projecting portions 2c of the vibrating body 2, and the main body portion 3a and the contact portion 3b are joined together by bonding, welding, or the like. In the present embodiment, a metallic material with high workability such as brass is used for the main body portion 3a, and stainless steel hardened by quenching is used for the contact portion 3b. The contact portion 3b has such a thickness as to have springiness and is capable of being in stable contact with the vibrating body 2 (the projecting portions 2c). It should be noted that the main body portion 3a may be not only annular but also disc-shaped (cylindrical).

The urging members 5 include a plurality of coil springs 5a, which is placed at substantially regular intervals in the circumferential direction of the vibrating body 2, and respective pressure receiving members 5b. It should be noted that here, pressure is generated using the coil springs 5a, but this is not limitative, and wave washers, leaf springs, disc springs, or the like may be used. A pressure transmission member 6 made of felt is interposed between the urging members 5 and the piezoelectric element 2a. Thus, by applying the pressure generated by the urging members 5 to the vibrating body 2 via the pressure transmission member 6, the vibrating body 2 is pressed against the contact body 3 with uniform force. It should be noted that not only felt but also rubber or the like may be used for the pressure transmission member 6.

An output transmission member 4 is mounted on an upper surface of the contact body 3 (which is an opposite surface to the surface of the contact body 3 in contact with the vibrating body 2, in a thrust direction i.e., a direction parallel to the rotational axis L1). The output transmission member 4 is composed of a vibration damping rubber 4a and a weight member 4b. The vibration damping rubber 4a has an annular shape and is made of butyl rubber, silicon rubber, or the like with high vibration damping performance. The weight member 4b is an annular elastic member and made of, for example, brass. The output transmission member 4 composed of the vibration damping rubber 4a and the weight member 4b damps out undesired vibrations to be generated in the contact body 3 while the vibration-type actuator 1 is running, which reduces noise generation and output deterioration.

The weight member 4b is mounted on an output unit 8 and rotates integrally with the output unit 8. The output unit 8 is composed of an output shaft 8a and a bearing pressurization member 8b, where the output shaft 8a includes a bearing mounting portion 8c, and the bearing pressurization member 8b includes an inner peripheral portion to be screwed onto the output shaft 8a. The output shaft 8a is hollow and rotatably supported by two rolling bearings 9 which include inner rings fitted on an outer peripheral portion of the bearing mounting portion 8c. Here, deep groove ball bearings are used as the rolling bearings 9, but this is not limitative, and other bearings such as angular contact ball bearings and plain bearings may be used. Alternatively, a single crossed roller bearing may be used to support the output shaft 8a.

Outer rings of the rolling bearings 9 are fitted on and fixed to the supporting member 10. The inner rings of the rolling bearings 9 are pressurized by the bearing pressurization member 8b screwed onto the output shaft 8a with a proper tightening torque. It should be noted that a spacer 10a is disposed between the two rolling bearings 9. This reduces wobbling of the rolling bearings 9 in a radial direction and prevents the output shaft 8a from vibrating in the radial direction.

In the vibration-type actuator 1, when driving voltage (alternating current voltage) is applied to the piezoelectric element 2a, an oval vibration occurs at a predetermined position of the vibrating body 2 to form a progressive wave (progressive vibrating wave), causing the vibrating body 2 to apply frictional driving force to the contact body 3. As a result, one of the vibrating body 2 and the contact body 3 rotates around the rotational axis L1 relatively to the other. In the present embodiment, it is assumed for the convenience of explanation that the supporting member 10 is fixed to a housing or the like, which is not illustrated, and the output shaft 8a is caused to rotate by rotation of the contact body 3.

Figure 2A:
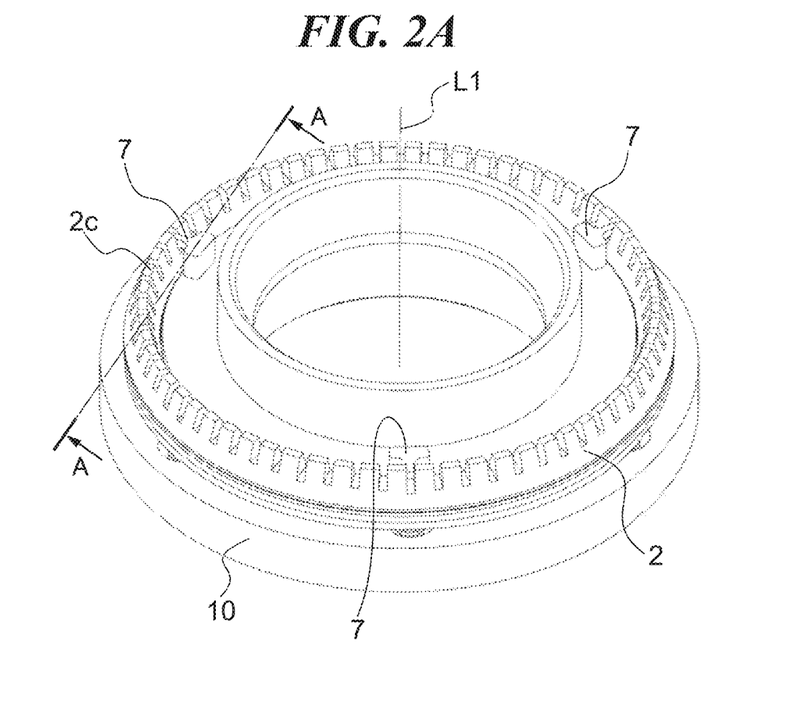
FIGS. 2A and 2B are a perspective view and an exploded perspective view, respectively, of a vibrating body constituting the vibration-type actuator in FIG. 1.
Figure 2B:
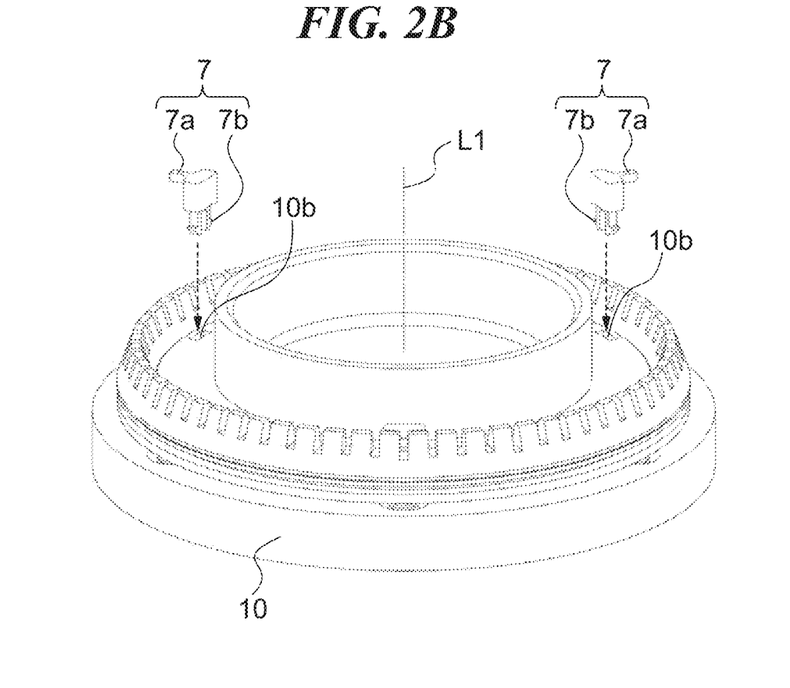

FIG. 2A is a perspective view illustrating the vibrating body 2 and its peripheral structure. FIG. 2B is a perspective view illustrating the vibrating body 2 in a partially exploded manner. In the circumferential direction of the vibrating body 2, three positioning and holding members 7 are disposed at substantially regular intervals, while facing the vibrating body 2. Each of the positioning and holding members 7, which are made of a resin material such as a polycarbonate material or polyacetal material, includes an interposing portion 7a and a mounting portion 7b, where interposing portion 7a is interposed between two (a plurality of) projecting portions 2c of the vibrating body 2, and the mounting portion 7b is mounted on the supporting member 10 by being inserted through a receiving portion 10b of the supporting member 10.

It should be noted that a plurality of positioning and holding members 7 is preferably provided, and more preferably, three or more positioning and holding members 7 are provided from the viewpoint of stably supporting the vibrating body 2. However, it is preferred that the number of positioning and holding members 7 is determined such that they do not decrease the mechanical strength of the supporting member 10 due to the distance between the receiving portions 10b becoming short and do not hinder the vibration excitation of the vibrating body 2.

Each positioning and holding member 7 includes one interposing portion 7a. The height of the interposing portion 7a is smaller than that of the projecting portion 2c, and the interposing portion 7a never touches the contact body 3. A side face (a surface facing the circumferential direction of the vibrating body 2) of the interposing portion 7a comes into contact with a rising wall surface of the projecting portion 2c (one of surfaces standing on both sides of the groove 2d), and this restrains rotation (movement) of the vibrating body 2 with respect to the supporting member 10. Each positioning and holding members 7, which is made of the resin material as described above, is in contact with the elastic body 2b only via the interposing portion 7a and is not in contact with the piezoelectric element 2a. Therefore, the positioning and holding members 7 never hinder the vibration excitation of the vibrating body 2.

Furthermore, the mounting portion 7b of each positioning and holding member 7 is mounted onto the corresponding receiving portion 10b of the supporting member 10 by what is called a snap-fit, an assembly mechanism using elastic deformation. Namely, the positioning and holding members 7 are configured to be easily mounted on the supporting member 10 without the need for using other materials such as an adhesive agent. It should be noted that such assembly without using an adhesive agent or the like makes manufacturing easier and reduces manufacturing costs.

It should be noted that in the thrust direction of the elastic body 2b (the direction parallel to the rotational axis L1), the piezoelectric element 2a is disposed between the elastic body 2b and the supporting member 10, and it is preferred that the positioning and holding members 7 are not in contact with a surface of piezoelectric element 2a which faces the supporting member 10.

Figure 3:
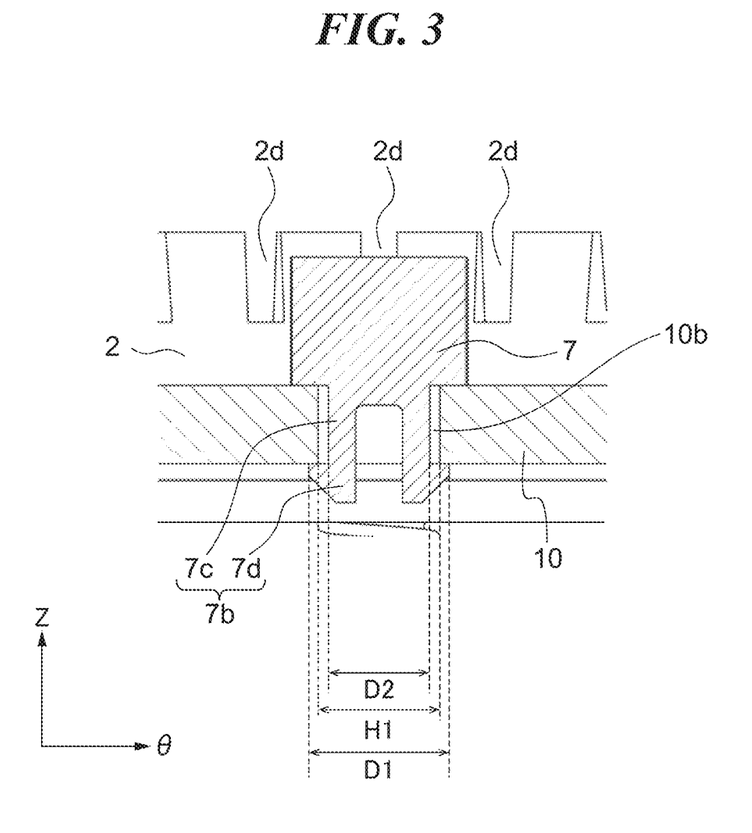
FIG. 3 is a cross-sectional view taken along the section line A-A with arrows indicating the direction of view in FIG. 2A.

FIG. 3 is a cross-sectional view taken along the section line A-A with arrows indicating the direction of view in FIG. 2A. The mounting portion 7b of each of the positioning and holding members 7 is composed of columnar portions 7c and hook portions 7d. The columnar portions 7c and the hook portions 7d are formed to be elastically deformable. As illustrated in FIG. 3, assuming that a tangential direction to an inner circumference of the vibrating body 2 that the mounting portion 7b faces is a θ direction, the mounting portion 7b is designed such that a width D1 of the two hook portions 7d in the θ direction (a distance between outermost portions of the two hook portions 7d in the θ direction) is greater than a width H1 of the receiving portion 10b (a hole into which the columnar portions 7c are inserted and which is engaged with the hook portions 7b) in the θ direction. To mount the positioning and holding member 7 on the supporting member 10, the two hook portions 7d are elastically deformed so as to become closer to each other and inserted through the receiving portion 10b. When the insertion of the two hook portions 7d through the receiving portion 10b is completed, the two hook portions 7d return to their original shapes and engage with the supporting member 10. This restrains Z-direction (the thrust direction of the vibrating body 2) movement of the positioning and holding member 7 and also restrains (holds or positions) Z-direction movement of the vibrating body 2 which is being pressed against the contact body 3 (in the Z direction) by the urging members 5.

The mounting portion 7b is designed such that a width D2 of the two columnar portions 7c in the θ direction (a distance between outer side faces of the two columnar portions 7c in the θ direction) is smaller than the width H1 of the receiving portion 10b in the θ direction. Thus, a clearance is formed between the columnar portions 7c and the receiving portion 10b (in the example illustrated in FIG. 3, between the columnar portions 7c and an inner wall of the supporting member 10 forming the hole, which is the receiving portion 10b), and this clearance allows the positioning and holding member 7 to move relatively to the groove 2d by the amount of the clearance in the θ direction. It allows positioning of the positioning and holding member 7 with respect to the supporting member 10 in the θ direction using the clearance formed between the columnar portions 7c and the receiving portion 10b. Thus, the width of the interposing portion 7a in the θ direction can be increased to such an extent that the interposing portion 7a can be inserted into the groove 2d in the θ direction. Namely, the width of the interposing portion 7a in the θ direction can be increased to the extent possible, and hence the stiffness of the positioning and holding member 7 in the θ direction can be increased. As a result, even if the vibration-type actuator 1 is rapidly accelerated or decelerated while running or is driven under excessive load, the interposing portion 7a is prevented from damage like cracking.

Figure 4A:
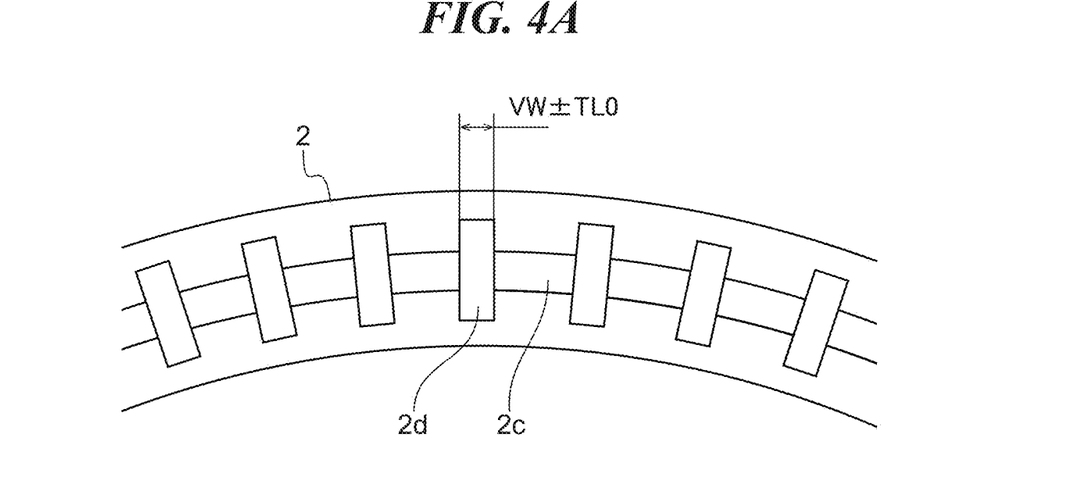
FIGS. 4A and 4B are partial top views of the vibrating body in FIGS. 2A and 2B.
Figure 4B:
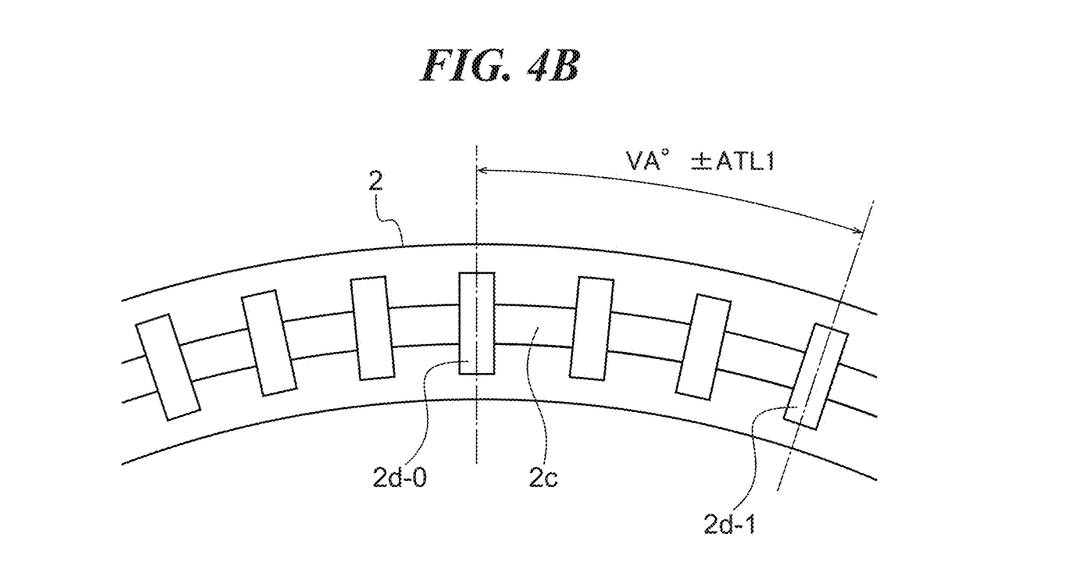

A description will now be given of effects of the clearance given between the columnar portions 7c and the receiving portion 10b. FIGS. 4A and 4B are partial top views of the vibrating body 2 (views of the vibrating body 2 as seen from the contact body 3 side in the direction parallel to the rotational axis L1). FIG. 4A is a view useful in explaining a width tolerance of the groove 2d, and FIG. 4B is a view useful in explaining an angular tolerance for the position of the groove 2d. It should be noted that in the following description referring to FIGS. 4A and 4B, dimensions are presented as concrete examples, but they are just examples and do not limit the arrangement of the vibration-type actuator 1.

As illustrated in FIG. 4A, the groove 2d has a width VW that varies by an amount corresponding to a width tolerance TL0. The reason for this is that the groove 2d is formed by mechanical machining such as cutting and its dimensions vary depending on the accuracy of a machine tool and the degree of wear of an edged tool. For example, assume that the width VW is 1 mm, and the width tolerance TL0 is 0.05 mm. In this case, to reliably interpose the interposing position 7a between the two (a plurality of) projecting portions 2c, the width of the interposing portion 7a should be equal to or smaller than a width calculated by VW−TL0, that is, 0.95 mm.

Moreover, as illustrated in FIG. 4B, an angle VA between two grooves 2d-0 and 2d-1 may vary by an amount corresponding to an angular tolerance ATL1 because the grooves 2d are formed by mechanical machining such as cutting as described above. For example, the angular tolerance ATL1 is 10' (minutes), which is equivalent to approximately 0.17 degrees. When the width, the angle, and their tolerances are those values, and an outer diameter of the vibrating body 2 is 62 mm, a dimensional tolerance TL1 in the direction of the width of the grooves 2d (the θ direction) is 0.09 mm, which is a product of the angular tolerance ATL1 and a radius of 31 mm.

On the other hand, when a conventional positioning and holding member integrally formed with a plurality of interposing portions described in Japanese Laid-Open Patent Publication (Kokai) No. 2019-45848 (hereafter referred to merely as the conventional positioning and holding member) is used, each interposing portion cannot be moved independently in the θ direction with respect to the corresponding groove 2d. Namely, the conventional positioning and holding member cannot adjust its position according to the angular tolerance of the grooves 2d. For this reason, to reliably interpose each interposing portion between the two (a plurality of) projecting portions 2c, it is necessary to make position adjustment possible by making the width of each interposing portion small. If the width, the angle, and their tolerances are the same as those described above, the width of each interposing portion of the conventional positioning and holding member needs to be equal to or smaller than 0.86 mm, which is a value calculated by VW−(TL0+TL1). The conventional positioning and holding member also has an angular tolerance ATL2 between the interposing portions. The angular tolerance ATL2 is 10' (minutes) because it arises from variations occurring at the time of resin molding. When the vibrating body 2 has an outer diameter of 62 mm, a dimensional tolerance in the direction of the width of the grooves 2d is 0.09 mm. Thus, to reliably interpose each interposing portion between the two (multiple) projecting portions 2c, each interposing portion needs to have a width of 0.77 mm or less, which is calculated by VW−(TL0+TL1+TL2) with consideration given to the width tolerance and angular tolerance of the corresponding groove 2d.

On the other hand, in the present embodiment, the multiple positioning and holding members 7 are made as separate members, and as illustrated in FIG. 3, spaces are formed in the ±θ direction (a horizontal direction in FIG. 3) between the receiving portion 10b of the supporting member 10 and the columnar portions 7c. In the present embodiment, the total size of the clearance, which is the sum of the left and right spaces, in the θ direction is not less than twice as large as the sum of the tolerance TL1 in the θ direction converted from the angular tolerance of the groove 2d and a tolerance TL3 in the θ direction converted from an angular tolerance of the receiving portions 10b. For example, when the angular tolerance of the receiving portions 10b is 10' (minutes), and the vibrating body 2 has an outer diameter of 62 mm, the tolerance TL3 in the θ direction is 0.08 mm, and the total size of the clearance which is twice as large as the sum is 0.34 mm or more.

The clearance allows the interposing portion 7a to move 0.17 mm at the maximum to the right or left in the θ direction. As a result, in response to a demand for decrease of the width of each interposing portion of the conventional positioning and holding member in the θ direction, the position of the positioning and holding member 7 according to the present embodiment becomes adjustable according to the angular tolerance of the grooves 2d and the angular tolerance of the receiving portions 10b without making the width of the interposing portions 7a in the θ direction small. Namely, only the width tolerance TL0 of the grooves 2d needs to be considered in determining the width of the interposing portions 7a in the θ direction, and therefore, to reliably interpose each interposing portion 7a between two (a plurality of) projecting portions 2c, the width of the interposing portions 7a in the θ direction should be equal to or smaller than a value calculated by VW−TL0. As a result, the interposing portions 7a of the positioning and holding member 7 can be wider than those of the conventional positioning and holding member, and hence the stiffness of the positioning and holding member 7 can be increased.

In the present embodiment, for the grooves 2d with the width VW of 1 mm and the width tolerance TL0 of 0.05 mm, the interposing portions 7a have a width of 0.95 mm and a width tolerance of −0.2 mm to 0 mm in the θ direction. In this case, a clearance between the groove 2d (the projecting portions 2c) and the corresponding interposing portion 7a in the θ direction is 0 mm at the minimum and 0.3 mm at the maximum, and the clearance between the receiving portion 10b and the corresponding columnar portions 7c in the θ direction is always larger than the clearance between the groove 2d and the corresponding interposing portion 7a in the θ direction. Namely, the clearance between the mounting portion 7b and the receiving portion 10b in the relative movement direction of the vibrating body 2 and the contact member 3 is larger than the clearance formed between the interposing portion 7a and the corresponding projecting portions 2c in the relative movement direction.

Figure 5A:
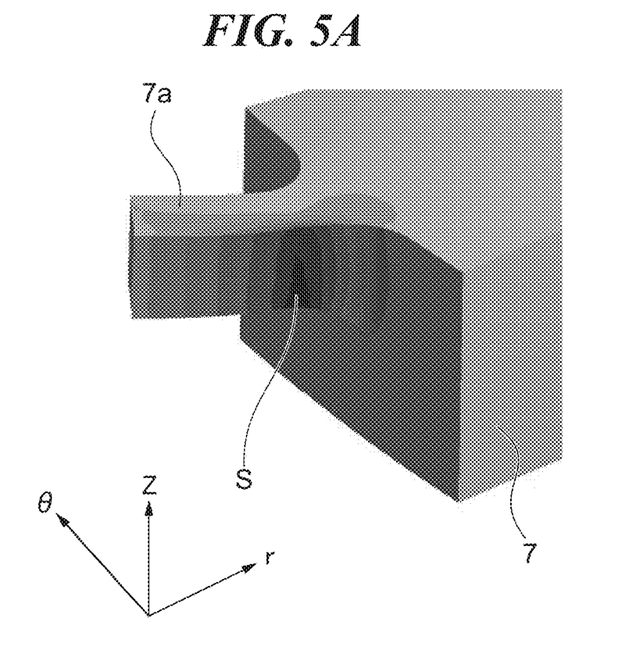
FIGS. 5A and 5B are views illustrating results of simulations of load applied to a positioning and holding member while the vibration-type actuator in FIG. 1 is running.
Figure 5B:
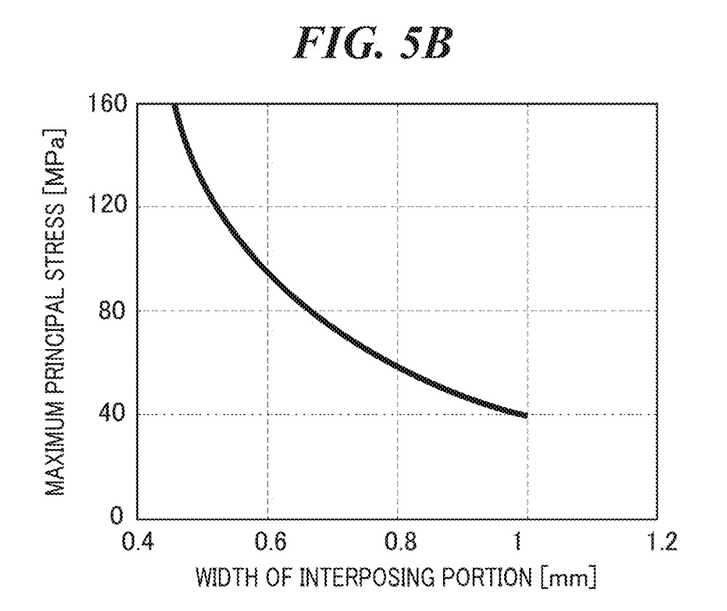

FIG. 5A is a view illustrating a result of a simulation performed to see how the interposing portion 7a is deformed in a case where a force imitating a load applied while the vibration-type actuator 1 is running is applied to the interposing portion 7a. FIG. 5B is a graph illustrating the relationship between width and maximum principal stress of the interposing portion 7a in the θ direction found from the simulation result. It should be noted that FIG. 5A illustrates the amount of deformation in an enlarged manner relative to actual dimensions of the interposing portion 7a so that how the interposing portion 7a is deformed can be easily understood. In FIG. 5A, darker areas indicate greater stress being applied.

As illustrated in FIG. 5A, when a load is applied to the interposing portion 7a while the vibration-type actuator 1 is running, the interposing portion 7a is deformed in the θ direction, and stress is concentrated in the area S around the bottom of the interposing portion 7a. For this reason, a crack may start to appear near the area S to cause breakage of the interposing portion 7a.

Referring to FIG. 5B, in the conventional positioning and holding member, the maximum width of the interposing portion in the θ direction is 0.77 mm as described above, and hence the maximum principal stress is 62 MPa. On the other hand, in the positioning and holding member 7 according to the present embodiment, the maximum width of the interposing portion 7a in the θ direction is 0.95 mm as described above, and hence the maximum principal stress is 43 MPa, which indicates that the maximum principal stress is decreased by at least 30%. This means that a use of the positioning and holding member 7 according to the present embodiment in an actuator achieves higher durability than a use of the conventional positioning and holding member in an actuator.

It should be noted that increasing torque of the vibration-type actuator 1 causes an increase in the load applied to the vibrating body 2 as well. Hence to reduce the stress generated in the interposing portions 7a, it is necessary to increase the number of interposing portions 7a. In the conventional positioning and holding member, since it is formed integrally with the plurality of interposing portions, an increased number of interposing portions need their width in the θ direction to be further reduced, in order to make the above-described adjustment according to the angular tolerance. It will cancel out the effect of easing the stress brought about by the increase in the number of interposing portions.

On the other hand, in the present embodiment, since each of the positioning and holding members 7 has one interposing portion 7a, there is no need to give consideration to the above-described adjustment according to the angular tolerance, and therefore, there is no need to narrow the width of the interposing portions 7a in the θ direction. Thus, increasing the number of interposing portions 7a can achieve the effect of easing the stress accordingly. Even if the vibration-type actuator 1 is a type of actuator that requires high torque, desired durability can be achieved by determining the number of interposing portions according to the load applied to the vibrating body 2.

In the present embodiment, the clearance formed between the columnar portions 7c and the receiving portion 10b when the positioning and holding member 7 is fitted on the supporting member 10 is sufficiently larger than clearances used for general types of fit such as clearance fits and transition fits. Specifically, in the present embodiment, the width D2 of the columnar portions 7c in the θ direction is set at 2.6 mm. In this case, when according to tolerance class commonly used for clearance fits, g7 (a tolerance zone: −0.012 mm to −0.002 mm) is used as a tolerance on the columnar portions 7c, and H7 (a tolerance zone: 0 mm to +0.01 mm) is used as a tolerance on the receiving portion 10b, it results in the clearance of 0.022 mm at the maximum. When according to a tolerance classes for looser fits, d9 (a tolerance zone: −0.045 mm to −0.02 mm) is used as a tolerance on the columnar portions 7c, and H8 (a tolerance zone: 0 mm to +0.014 mm) is used as a tolerance on the receiving portion 10b, it results in the clearance of 0.059 mm at the maximum.

On the other hand, in the present embodiment, the clearance formed between the columnar portions 7c and the receiving portion 10b is 0.34 mm or more, and this is about 15 times as large as the clearance in fit according to the commonly used tolerance zone and 6 times as large as the clearance in relatively loose fits. The reason for this is that even if preparing the interposing portions of the conventional positioning and holding member are formed as units separate from the supporting member 10, and then mounted on the supporting member by fit, it is insufficient to obtain a clearance necessary for adjustments to be carried out for the angular tolerance in the present embodiment. Namely, to obtain the above-described effects when the positioning and holding member 7 having one interposing portion 7a is used, it is necessary to form a larger clearance than clearances used in general types of fit.

A description will now be given of a vibration-type actuator according to a second embodiment of the present invention. The vibration-type actuator according to the second embodiment differs from the vibration-type actuator 1 according to the first embodiment only in structures of positioning and holding member and a supporting member on which the positioning and holding member is mounted. Therefore, the following description focuses on those differences, and the same features as those of the vibration-type actuator 1 will not be illustrated or described.

Figure 6A:
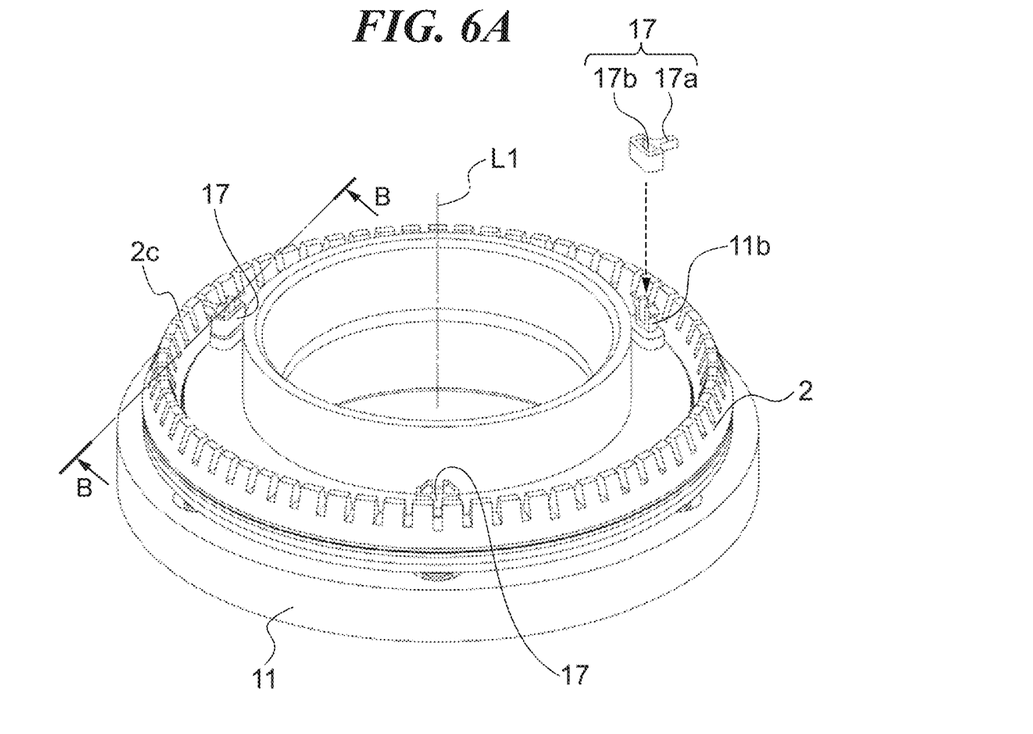
FIG. 6A is an exploded perspective view of a vibrating body constituting a vibration-type actuator according to a second embodiment of the present invention.
Figure 6B:
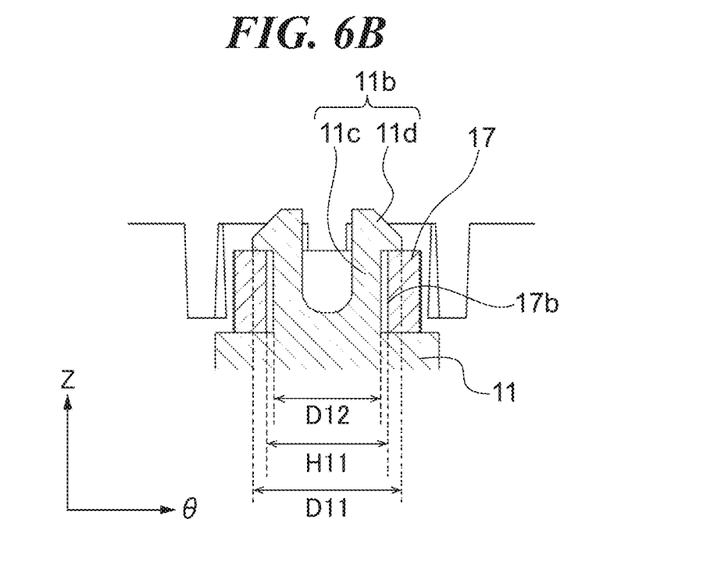
FIG. 6B is a cross-sectional view taken along the section line B-B with arrows indicating the direction of view in FIG. 6A.

FIG. 6A is an exploded perspective view of the vibrating body 2 according to the second embodiment and its peripheral structure. FIG. 6B is a cross-sectional view taken along the section line B-B with arrows indicating the direction of view in FIG. 6A. It should be noted that the θ direction in FIG. 6B is defined in the same way as in the first embodiment described above.

In the circumferential direction of the vibrating body 2, three positioning and holding members 17 are disposed at substantially regular intervals, while facing the vibrating body 2. Each of the positioning and holding members 17 includes an interposing portion 17a and a mounting portion 17b, where the interposing portion 17a is interposed between two (a plurality of) projecting portions 2c of the vibrating body 2, and the mounting portion 17b through which a receiving portion 11b of the supporting member 11 is inserted is mounted on the supporting member 11. A side face of the interposing portion 17a comes into contact with a standing wall surface of the projecting portions 2c, and this restrains rotation of the vibrating body 2 with respect to the supporting member 11. Each receiving portion 11b of the supporting member 11 is formed, to be paired with the corresponding mounting portion 17b, into what is called a snap-fit joint, an assembly mechanism using elastic deformation. Such assembly mechanism does not need other materials such as an adhesive agent, and achieves easy mounting of the positioning and holding members 17 on the supporting member 11.

As illustrated in FIG. 6B, each receiving portion 11b is composed of receiving columnar portions 11c and receiving hook portions 11d. A width D11 of the receiving hook portions 11d in the θ direction is greater than a width H11 of the mounting portions 17b in the θ direction. When the receiving portion 11b is inserted through the mounting portion 17b, the two receiving hook portions 11d are elastically deformed so as to get closer to each other in the θ direction so that the receiving portion 11b can be inserted through the mounting portion 17b. After the insertion is completed, the receiving hook portions 11d return to their original shapes, holding the position of the positioning and holding members 17 in the Z direction. As is clear from comparison between the first embodiment and the second embodiment, either one of a mounting portion and a receiving portion should have columnar portions and hook portions, and the other one should have a hole into which the columnar portions are inserted and which is engaged with the hook portions.

The width H11 of the mounting portion 17b in the θ direction is greater than the width D12 of the receiving columnar portions 11c in the θ direction, and a clearance is formed in the θ direction between the mounting portion 17b and the receiving columnar portions 11c. The clearance allows the position of the positioning and holding member 17 in the θ direction to shift relatively to the groove 2d. The clearance is prepared such that its size in the θ direction is always greater than that of a clearance between the projecting portions 2c and the interposing portion 17a in the θ direction as with the first embodiment. It allows positioning of the positioning and holding member 17 in the θ direction using the clearance provided between the mounting portion 17b and the receiving columnar portions 11c, and the width of the interposing portion 17a in the θ direction can be increased to such a level that the interposing portion 17a can be inserted into the groove 2d.

As described above, each positioning and holding members 17 according to the present embodiment is formed such that the interposing portion 17a has a greater width in the θ direction in comparison with the interposing portions in the conventional positioning and holding member as with the positioning and holding members 7 of the first embodiment. It increases the stiffness of the positioning and holding members 17 in the θ direction, which results in the durability of the vibration-type actuator being improved. Moreover, since the positioning and holding members 17 are not in contact with the piezoelectric element 2a and are in contact with the vibrating body 2 only via the interposing portions 17a, the positioning and holding members 17 stably support the vibrating body 2 without hindering vibration of the vibrating body 2. It should be noted that the number of positioning and holding members 17 should be determined appropriately according to the magnitude of load applied to the vibration-type actuator as with the first embodiment.

A description will now be given of a vibration-type actuator according to a third embodiment of the present invention. The vibration-type actuator according to the third embodiment differs from the vibration-type actuators according to the first and second embodiments only in structures of a positioning and holding member and a supporting member on which the positioning and holding member is mounted. Therefore, the following description focuses on those differences, and the same features as those of the vibration-type actuators according to the first and second embodiments will not be illustrated or described.

Figure 7A:
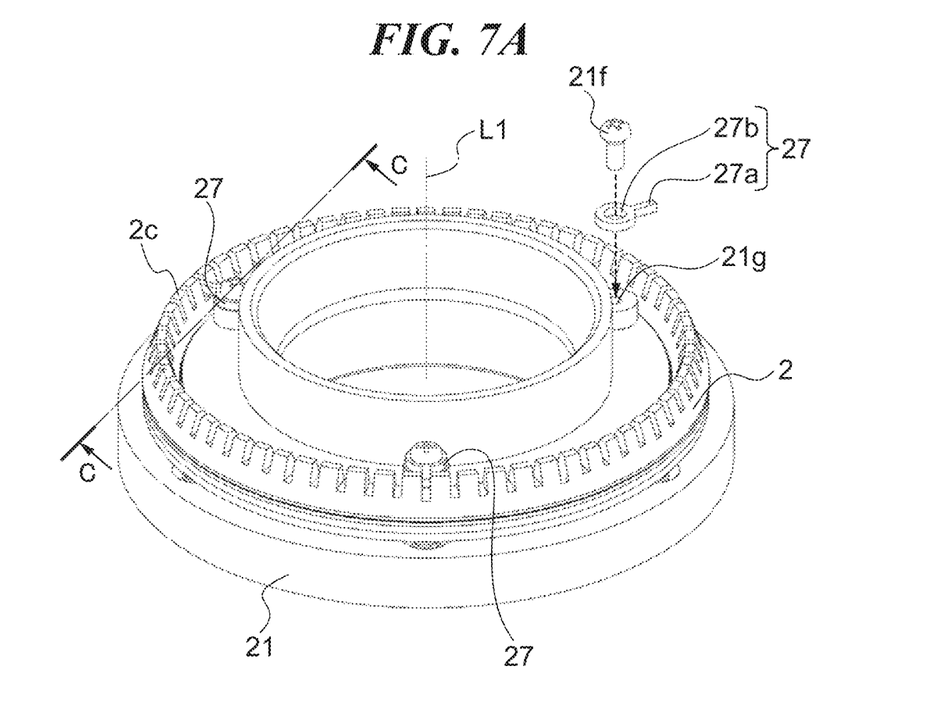
FIG. 7A is an exploded perspective view of a vibrating body constituting a vibration-type actuator according to a third embodiment of the present invention.
Figure 7B:
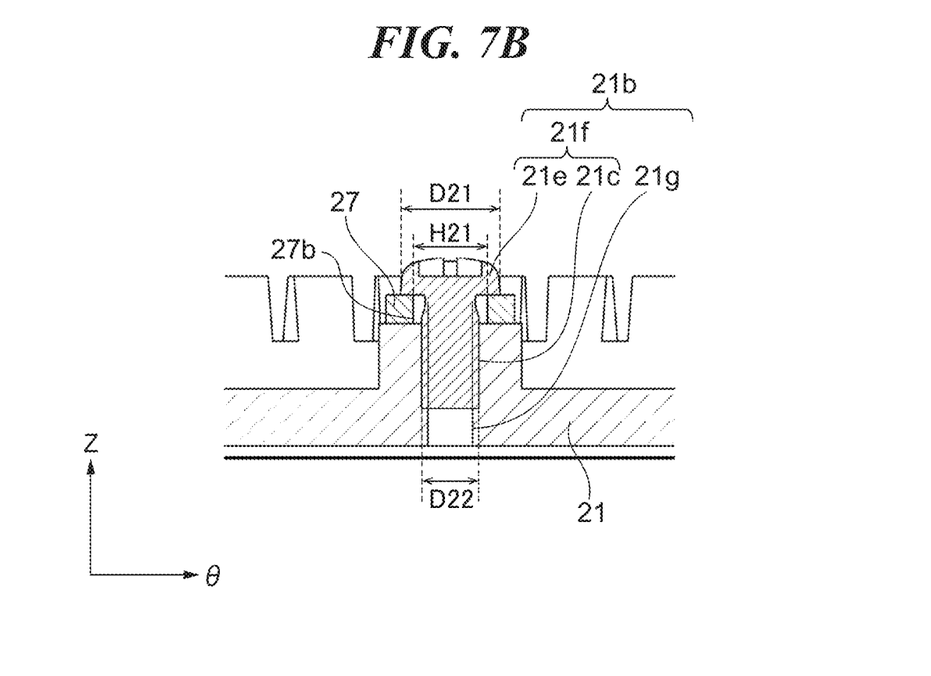
FIG. 7B is a cross-sectional view taken along the section line C-C with arrows indicating the direction of view in FIG. 7A.

FIG. 7A is an exploded perspective view of a vibrating body 2 of a vibration-type actuator according to the third embodiment and its peripheral structure. FIG. 7B is a cross-sectional view taken along the section line C-C with arrows indicating the direction of view in FIG. 7A. It should be noted that the θ direction in FIG. 7B is defined in the same way as in the first embodiment described above.

In the circumferential direction of the vibrating body 2, three positioning and holding members 27 are disposed at substantially regular intervals, while facing the vibrating body 2. Each of the positioning and holding members 27 includes an interposing portion 27a and a mounting portion 27b, where the interposing portion 27a is interposed between two (a plurality of) projecting portions 2c of the vibrating body 2, and the mounting portion 27b is fastened on a screw hole 21g of a supporting member 21. A side face of the interposing portion 27a comes into contact with a standing wall surface of the projecting portions 2c, and this restrains rotation of the vibrating body 2 with respect to the supporting member 21. Each receiving portion 21b of the supporting member 21 is composed of a screw member 21f and the screw hole 21g, and the mounting portion 27b is fastened to the supporting member 21 (the screw hole 21g) with the screw member 21f.

The screw member 21f is composed of a receiving columnar portion 21c and a screw head portion 21e. A width D21 of the screw head 21e in the θ direction is greater than a width H21 of the mounting portion 27b in the θ direction, and hence the screw member 21f locks a position of the positioning and holding member 27 in the Z direction. The width H21 of the mounting portion 27b in the θ direction is greater than a width D22 of the receiving columnar portion 21c in the θ direction, and a clearance is provided between the mounting portion 27b and the receiving columnar portion 21c. This clearance allows the position of the positioning and holding member 27 in the θ direction to shift relatively to the groove 2d. The clearance is prepared such that its size in the θ direction is always greater than the clearance between the projecting portions 2c and the interposing portion 27a in the θ direction as with the first embodiment. It allows positioning of the positioning and holding member 27 in the θ direction using the clearance provided between the mounting portion 27b and the receiving columnar portion 21c, and the width of the interposing portion 27a in the θ direction can be increased to such a level that it can be inserted into the groove 2d.

As described above, each positioning and holding member 27 according to the present embodiment is formed such that the interposing portion 27a has a greater width in the θ direction in comparison with the interposing portions of the conventional positioning and holding member as with the positioning and holding member 7 according to the first embodiment. It increases the stiffness of the positioning and holding members 27 in the θ direction, which results in the durability of the vibration-type actuator being improved. Moreover, since the positioning and holding members 27 are not in contact with the piezoelectric element 2a and are in contact with the vibrating body 2 only via the interposing portion 27a, the positioning and holding members 27 stably support the vibrating body 2 without hindering vibration of the vibrating body 2. After screwing of the screw members 21f, the positioning and holding members 27 are fixed to the supporting member 21, and hence the vibrating body 2 never moves in the A direction while the vibration-type actuator is running, so that the vibration-type actuator can be driven with high accuracy. As with the first embodiment, the number of positioning and holding members 27 can be determined appropriately according to the magnitude of load applied to the vibration-type actuator.

It should be noted that the clearance between the mounting portion 27b and the receiving columnar portion 21c has a size necessary for adjustments according to the angular tolerance of the grooves 2d and the screw holes 21g. Moreover, as illustrated in FIG. 7B, the receiving columnar portion 21c has a shape that is constricted toward the screw head portion 21e, so that the distance to the mounting portion 27b varies in the Z direction. Even with this arrangement, the above-described effects can be obtained as long as the clearance at a position where the distance to the mounting portion 27b is the closest has the above-mentioned size.

Although in the above description of the first to third embodiments, the present invention is applied to the rotary type vibration wave driving apparatuses, the technical idea of the present invention may be applied not only to the rotary type vibration wave driving apparatuses but also to linear type vibration wave driving apparatuses. In the linear type vibration wave driving apparatuses, an elastic body has a linear shape, and the relative movement direction is a direction in which one of a vibrating body and a contact body linearly move relatively to the other.

A description will now be given of an industrial robot that is an example of the apparatuses (equipment) having the vibration-type actuators according to the embodiments described above.

Figure 8:
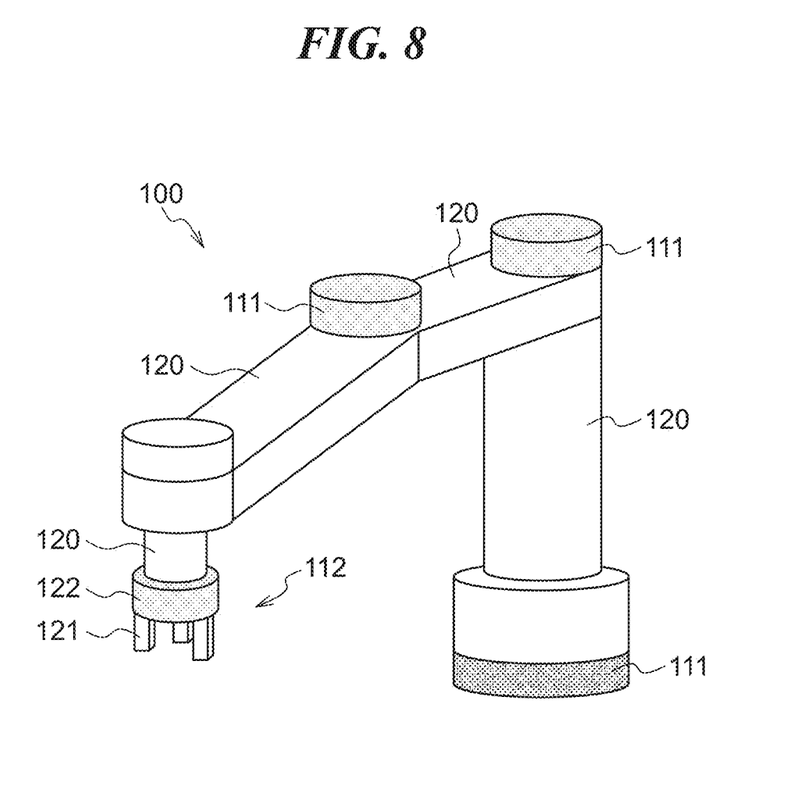
FIG. 8 is a perspective view schematically illustrating an arrangement of a robot according to a fourth embodiment of the present invention.

FIG. 8 is a perspective view schematically illustrating an arrangement of a robot 100 equipped with vibration-type actuators, and a horizontal multi joint robot, which is a kind of industrial robot, is illustrated here. The robot 100 has arm joint units 111 and a hand unit 112. Each of the arm joint units 111 connects two arms 120 together such that an angle at which the two arms 120 cross each other can be changed. The hand unit 112 includes the arm 120, a holding unit 121 mounted on one end of the arm 120, and a hand joint unit 122 that connects the arm 120 and the holding unit 121 together. The vibration-type actuators are incorporated in the arm joint units 111 and the holding unit 121 to carry out adjustments in angle and rotate the arms 120 and the hand joint unit 122.

A description will now be given of a platform apparatus according to a fifth embodiment, which is an example of the apparatuses (equipment) having the vibration-type actuators according to the embodiments described above.

Figure 9A:
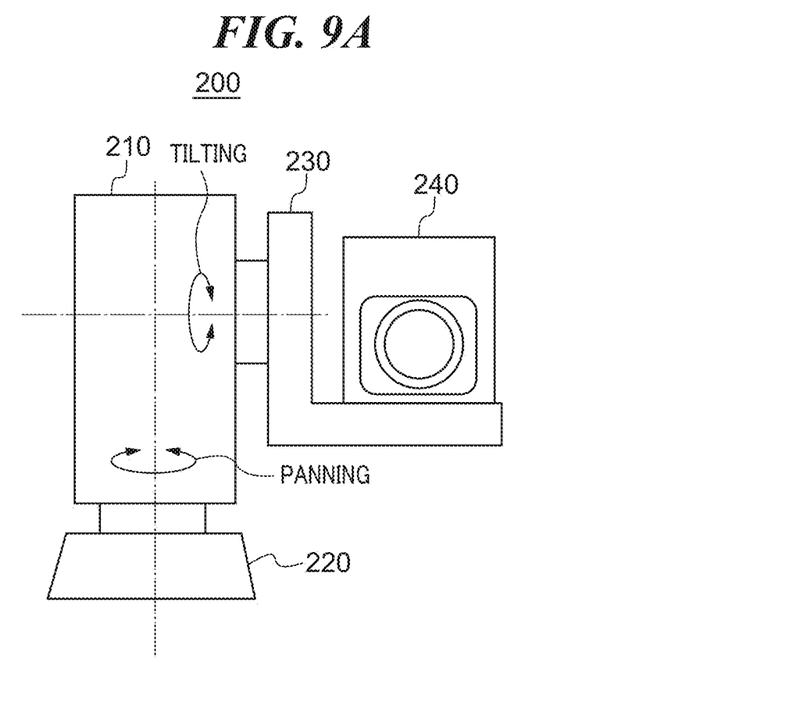
FIGS. 9A and 9B are a front view and a side view, respectively, schematically illustrating an arrangement of a platform apparatus according to a fifth embodiment of the present invention.
Figure 9B:
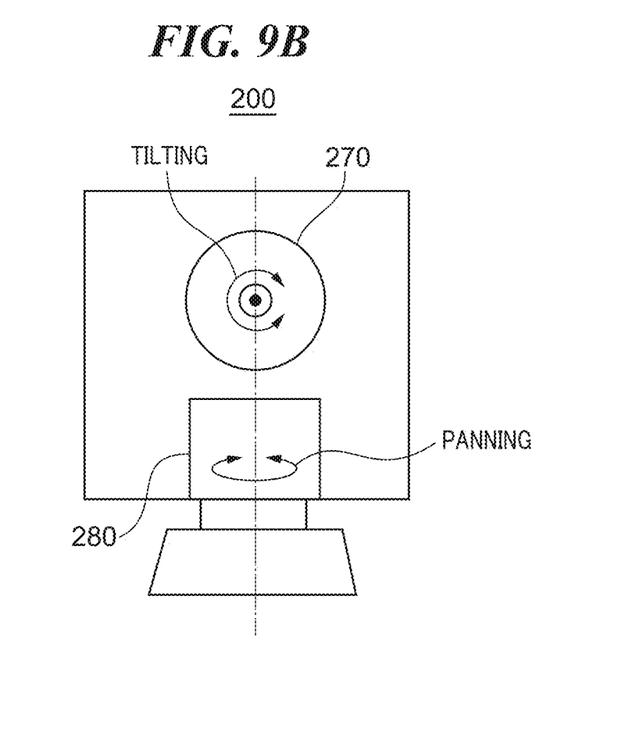

FIG. 9A is a front view illustrating an appearance of the platform apparatus 200, and FIG. 9B is a side view of the platform apparatus 200. The platform apparatus 200 includes a head unit 210, a base unit 220, an L-shaped angle 230, and an image pickup apparatus 240.

Two vibration-type actuators are disposed inside the head unit 210. An output unit of a vibration-type actuator 280 for panning is coupled to the platform apparatus 200, and driving the vibration-type actuator 280 causes the head unit 210 to pan relatively to the base unit 220. An output unit of a vibration-type actuator 270 for tilting is coupled to the L-shaped angle 230, and driving the vibration-type actuator 270 causes the L-shaped angle 230 to tilt relatively to the head unit 210.

The image pickup apparatus 240 mounted on the L-shaped angle 230 is a camera for shooting video and still images. The image pickup apparatus 240 performs shooting while it is caused to pan and tilt by driving the vibration-type actuators 270 and 280. On the other hand, the vibration-type actuators 270 and 280 are capable of maintaining their positions using frictional force even when they are not energized, and therefore, after they position the platform apparatus 200, the energization of the vibration-type actuators 270 and 280 can be stopped to reduce power consumption, and shooting can be continued while the vibration-type actuators 270 and 280 are not energized. It should be noted that although here, the image pickup apparatus 240 is mounted on the L-shaped angle 230 of the platform apparatus 200, the platform apparatus 200 may be used for purposes other than photo shooting by changing what is mounted on the platform apparatus 200.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although in the above description, the robot 100 and the platform apparatus 200 are illustated as example apparatuses including vibration-type actuators, the present invention may be applied to various types of apparatuses that drive desired components using driving force generated by vibration-type actuators.

This application claims the benefit of Japanese Patent Application No. 2020-119930, filed on Jul. 13, 2020, which is hereby incorporated by reference herein in its entirety.

What is claimed is:

1. A vibration-type actuator comprising:
a vibrating body;
a contact body in contact with the vibrating body;
a supporting member that supports the vibrating body; and
at least one positioning and holding member that restrains movement of the vibrating body with respect to the supporting member in a relative movement direction in which one of the vibrating body and the contact body moves relatively to the other,
wherein the vibrating body comprises:
an elastic body comprising grooves and projecting portions that are alternately formed in the relative movement direction; and
an electromechanical transducer that is mounted on the elastic body,
the at least one positioning and holding member comprises:
an interposing portion that is interposed between a plurality of the projecting portions; and
a mounting portion that is mounted on the supporting member,
the supporting member comprises a receiving portion onto which the mounting portion is mounted with a clearance, and
the clearance is formed between the mounting portion and the receiving portion in the relative movement direction.

2. The vibration-type actuator according to claim 1, wherein each of the at least one positioning and holding member comprises the one interposing portion disposed in one of the grooves.

3. The vibration-type actuator according to claim 1, wherein in the relative movement direction, a plurality of the positioning and holding members is mounted on the supporting member.

4. The vibration-type actuator according to claim 3, wherein the plurality of the positioning and holding members is disposed at substantially regular intervals in a circumferential direction of the vibrating member.

5. The vibration-type actuator according to claim 1, wherein
in a thrust direction of the elastic body, the electromechanical transducer is disposed between the elastic body and the supporting member, and
the at least one positioning and holding member is not in contact with a surface of the electromechanical transducer that faces the supporting member.

6. The vibration-type actuator according to claim 1, wherein the clearance is larger than a clearance formed between the interposing portion and the plurality of the projecting portions in the relative movement direction.

7. The vibration-type actuator according to claim 1, wherein
one of the mounting portion and the receiving portion comprises a columnar portion and a hook portion that are elastically deformable, and the other of the mounting portion and the receiving portion comprises a hole into which the columnar portion is inserted and with which the hook portion is engaged, and the mounting portion and the receiving portion engage with each other by elastically deforming and inserting the columnar portion and the hook portion into the hole and then causing the columnar portion and the hook portion to return to their original shapes.

8. The vibration-type actuator according to claim 1, wherein the mounting portion is fastened to the receiving portion with a screw.

9. The vibration-type actuator according to claim 1, wherein
the elastic body has an annular shape, and
the relative movement direction is a direction in which one of the vibrating body and the contact body rotates relatively to the other around a center line of the elastic body in the annular shape.

10. An apparatus comprising:
a vibration-type actuator; and
a member to be driven by the vibration-type actuator,
wherein the vibration-type actuator comprises:
 a vibrating body;
 a contact body that is in contact with the vibrating body;
 a supporting member that supports the vibrating body; and
 at least one positioning and holding member that restrains movement of the vibrating body with respect to the supporting member in a relative movement direction in which one of the vibrating body and the contact body moves relatively to the other,
the vibrating body comprises:
 an elastic body comprising grooves and projecting portions that are alternately formed in the relative movement direction; and
 an electromechanical transducer that is mounted on the elastic body, and
the at least one positioning and holding member comprises:
 an interposing portion that is interposed between a plurality of the projecting portions; and
 a mounting portion that is mounted on the supporting member,
the supporting member comprises a receiving portion onto which the mounting portion is mounted with a clearance, and
the clearance is formed between the mounting portion and the receiving portion in the relative movement direction.

\* \* \* \* \*